United States Patent [19]

King

[11] 3,750,487
[45] Aug. 7, 1973

[54] AUTOMATIC CHAIN OR BELT RE-TENSIONING DEVICE FOR VARIABLE-SPEED DRIVE

[75] Inventor: Graham Garton King, Lyon, France

[73] Assignee: Societe PIV, Villeurbanne, France

[22] Filed: Oct. 21, 1971

[21] Appl. No.: 191,231

[30] Foreign Application Priority Data
Oct. 22, 1970 France .............................. 7039151

[52] U.S. Cl. ..................... 74/242.8, 74/230.17 A
[51] Int. Cl. ..................... F16h 7/08, F16h 55/22
[58] Field of Search ................. 74/242.8, 230.17 A

[56] References Cited
UNITED STATES PATENTS

| 3,136,169 | 6/1964 | Kärger et al. .............. 74/230.17 A |
| 3,090,246 | 5/1963 | Berens ...................... 74/230.17 A |
| 3,097,540 | 7/1963 | Berens ...................... 74/230.17 A |
| 3,138,033 | 6/1964 | Glasson et al. ............. 74/230.17 A |
| 3,490,301 | 1/1970 | Steuer ....................... 74/230.17 A |

Primary Examiner—Leonard H. Gerin
Attorney—Robert E. Burns et al.

[57] ABSTRACT

This device for automatically re-tensioning the chain or belt of a variable speed drive or mechanism of the type comprising two pairs of conical disks of which the distance between centers is controlled by means of a pair of levers pivoted about pivot pins of which the relative spacing is adjustable by means of a transverse screw comprises a spiral spring having its outer end attached to a first disk held against motion by suitable means and its inner end anchored to a ring member rigid with another disk provided with a first pair of pawls co-acting with a first ratchet wheel rigid with the re-tensioning screw, this screw being also rigid with another ratchet wheel adapted to be actuated by a second pawl carried by the first disk when said first disk is released from its holding means. (FIG. 4).

5 Claims, 4 Drawing Figures

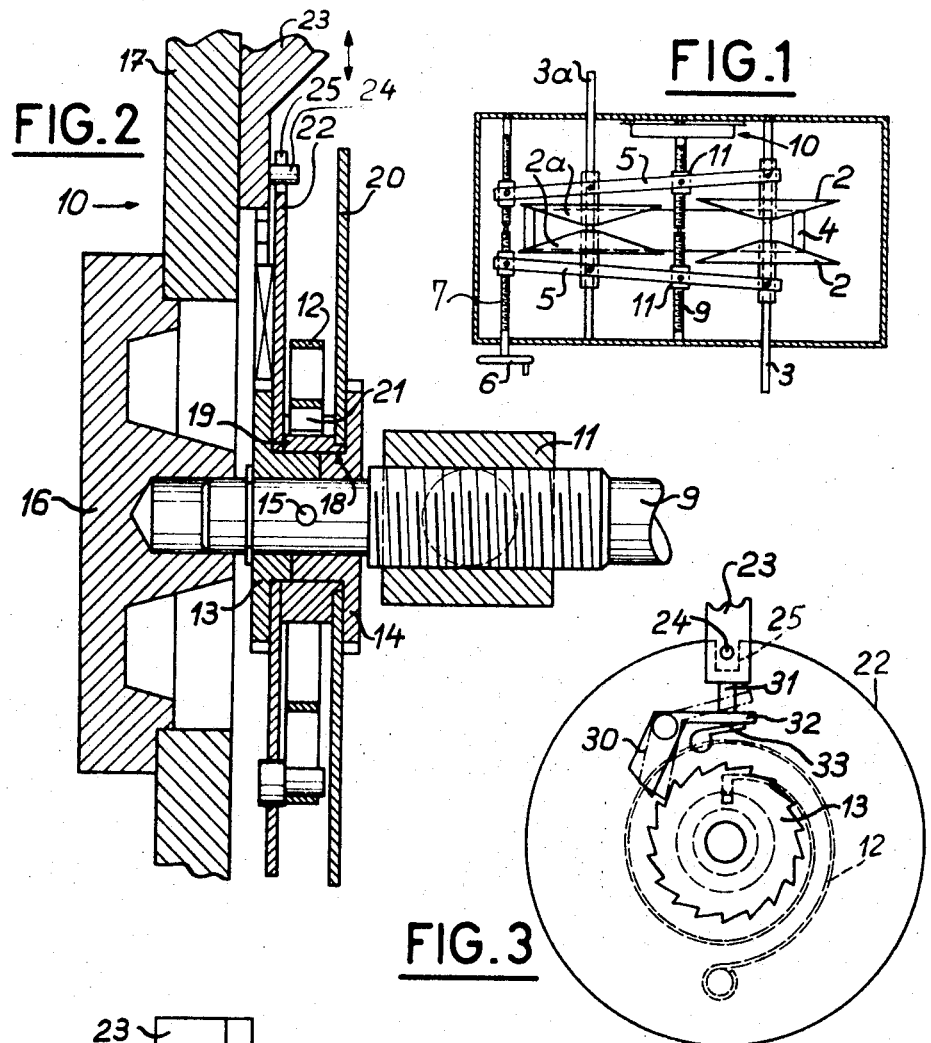
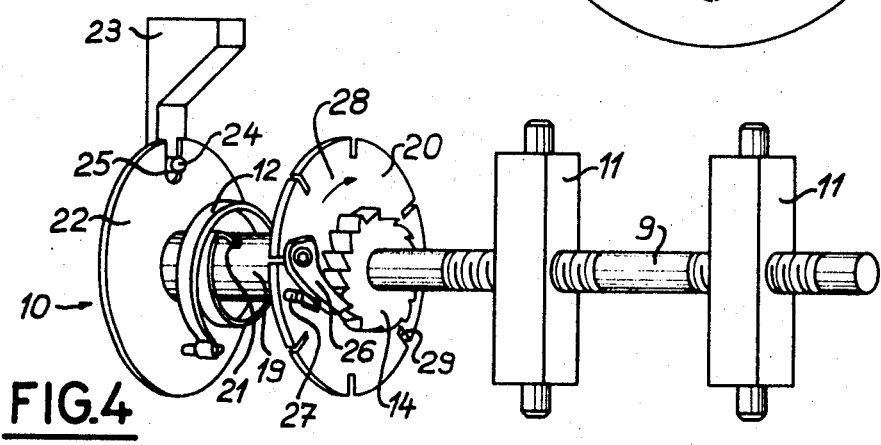

3,750,487

AUTOMATIC CHAIN OR BELT RE-TENSIONING DEVICE FOR VARIABLE-SPEED DRIVE

FIELD OF THE INVENTION

The presente invention relates in general to variable-speed drives and like mechanisms, and has specific reference to an automatic chain or belt retensioning device for an apparatus of this character.

DESCRIPTION OF THE PRIOR ART

Variable-speed drives are well known which comprises two pairs of conical disks mounted on two parallel shafts between which a chain or belt is disposed. The two disks of each pair are mounted for axial movement on their common shaft and the axial movement of the disks of both pairs is controlled through a pair of levers connected to the hubs of said disks and pivotally mounted about shafts extending across the chain or belt intermediate the two pairs of disks. The two pivot pins of said levers are carried by two struts or internally screw threaded sockets engaged by a screw controlling the tension in the chain or belt. Rotating this screw in the proper direction will move the two pivot pins of said levers and therefore the two disks of each pair towards each other.

SUMMARY OF THE INVENTION

It is a primary objeect of this invention to provide a device for automatically re-tensioning the chain or belt in a variable-speed drive of this character, this device comprising a spiral spring having a fixed end and its other end operatively connected to the above-mentioned control screw in order to produce a preponderance of the spring force as the resistant stress of the chain or belt decreases with respect to the disks engaged thereby, and therefore as the chain or belt wears out, said preponderance causing a certain rotation of the tension screw which, by modifying the positions of the pivot pins of the disk control levers, restores the chain or belt tension to the proper value.

It is another object of this invention to provide an automatic re-tensioning device of the type broadly set forth hereinabove, so designed and arranged that the chain or belt can be replaced at any time without any interference by the re-tensioning device during this operation.

To this end, the present invention provides a device for automatically re-tensioning a chain or belt in a variable-speed drive of the above-mentioned type, characterized in that it comprises a spiral spring having its outer end attached to a first disk held against movement by suitable means and its inner end anchored to a ring rigid with another disk provided with a first pawl co-acting with a first ratchet wheel rigid with the re-tensioning shaft, said shaft being also rigid with another ratchet wheel adapted to be actuated by a second pawl carried by the first disk when this first disk is released from its holding means.

BRIEF DESCRIPTION OF THE DRAWING

FIG. 1 is a diagrammatic plane view of a variable-speed drive of the chain or belt type, comprising an automatic re-tensioning device according to this invention ;

FIG. 2 is an axial sectional view showing on a larger scale the automatic re-tensioning device of this invention ;

FIG. 3 is an elevational view of the rear portion of the re-tensioning device ;

FIG. 4 is a perspective, general view of the automatic re-tensioning device of which the dimensions, in the axial direction, have been exaggerated on purpose for the sake of clarity.

DESCRIPTION OF THE PREFERRED EMBODIMENT

Reference will be made firstly to FIG. 1 illustrating a conventional variable-speed drive.

This drive comprises two pairs of conical pulley disks 2, 2a, keyed to a pair of parallel shafts 3, 3a on which however they can move axially ; the two pairs of disks are drivingly interconnected by a chain or belt 4.

The two pairs of disks 2 and 2a are controlled simultaneously by means of two pairs of levers 5 controlled for example by means of a hand wheel 6 rigid with a speed adjustment screw 7 comprising two sections having opposite pitches.

Each pair of levers 5 is pivoted on a strut 11 acting as a fulcrum and formed with transverse tapped bores engaged by a common tension screw 9 of the opposite-pitch type ; this screw 9 is disposed between, and parallel to, the pair of disk-supporting shafts 3, 3a.

Thus, by rotating the opposite-pitch screw 9 in the direction to move the struts 11 and therefore the pivot pins of the two levers towards each other, the conical disks of each pair will tend to move towards each other and thus increase the tension of chain or belt 4.

The present invention provides a device 10 adapted automatically to rotate the opposite-pitch screw or tightening spindle 9 in order to adjust the chain or belt tension as the chain or belt wear out.

Reference will now be made to FIGS. 2, 3 and 4.

The opposite-pitch screw 9 carries the pivot struts 11 adapted to be moved towards or away from each other according as the screw 9 is rotated in one or the other direction, as already explained in the foregoing. Obviously, this automatic re-tensioning device 10, when operating, will tend to rotate the screw 9 in the direction to move the struts 11 towards each other in order to make up for the wear of the chain or belt.

Now the power necessary for producing this rotation is provided by a spiral spring 12 tending to expand.

To permit the application of the force of spring 12 to the opposite-pitch screw 9, this crew comprises at its end a pair of ratchet wheels 13, 14 rigidly interconnected by means of a cross-pin 15 and held against axial movement by a circlips.

The adjacent end of screw 9 is journalled in a bearing plate 16 ridigly secured to the frame structure or case 17 of the variable-speed mechanism.

The thus assembled ratchet wheels 13, 14 provide a cylindrical surface 18 which is the surface of their assembled hubs ; on this cylindrical surface 18 a ring 19 and a disk 20 are journalled for free rotation. The disk 20 is rigid with the ring 19 and these two members could of course consist of a single element. The ring 19 comprises a notch 21 engaged the inner end of spiral spring 12.

The outer end of spiral spring 12 is attached to another disk 22 adapted to rotate freely on the aforesaid cylindrical surface 18 of ratchet wheels 13 and 14, However, this disk 22 is normally locked by a holding device 23 slidably mounted on the frame structure or case 17. This holding device comprises a stud 24 releasably engaging a notch 25 formed in the outer periphery of the disk 22.

The disk 20 comprises a pawl 26 urged by a spring 27 for engagement with the teeth of ratchet wheel 14. The arrangement is such that this wheel can revolve only in the clockwise direction, as shown in FIG. 4.

Thus, when the spiral spring 12 is cocked and tends to expand, it applies a torque to ring 19 via notch 21, this ring 19 transmits the torque to the ratchet wheel 14 via pawl 26, the ratchet wheel 14 drives a screw 9 in the counter-clockwise direction (as seen in FIG. 4). To cock the spring 12, it is only necessary to rotate the disk 20 in the direction of the arrow 28 (i.e., in the clockwise direction as seen in FIG. 3) by means of a screwdriver or other tool engaging notches 29 provided for this purpose in the periphery of disk 20.

Of course, the distance between the axes of fulcrum struts 11 may be modified freely from time to time for various reasons such as the replacement of a chain or belt, or for maintenance purposes. In this case, it is most desirable that the automatic re-tensioning device does not interfere with this operation, and notably that the spring 12 be not released suddenly. Therefore, to permit the free actuation of pivot struts 11, the re-tensioning device 10 comprises a second ratchet wheel 13 and a pawl 30 pivoted on the outer face of disk 22 for engagement with the ratchet wheel 13. The holding device 23 adapted to slide on the frame structure or case 17 for releasing the stud 24 from notch 25 comprises a stop member 31 at its lower end, and this stop member 31 is engaged by an arm 32 of pawl 30 due to the force of a spring 33. The stop member 31 will thus normally hold the pawl 30 away from the ratchet wheel 13.

When the stud 24 is released from the notch 25 of disk 22, by causing the device 23 to slide upwards, the pawl 30 urged by spring 33 engages the ratchet wheel 13 (this wheel 13 being locked against rotation in a direction opposite to that of ratched wheel 14, i.e., in the lockwise direction, as seen in FIG. 3, and in the opposite direction in FIG. 4). The spring 12 is thus somewhat "short-circuited" or "by-passed" since it is effective with respect to both disks 20 and 22 acting in turn through pawls 26, 30 on the pair of rigidly interconnected ratchet wheels 14, 13 having opposite directions of rotation as a consequence of the particular mounting of their pawls. At the same time, as the stud 24 of holding device 23 is released from notch 25, the complete automatic re-tensioning device 10 can rotate freely with the screw 9, thus permitting the desired movement of pivot struts 11.

Although this invention has been described with reference to a preferred form of embodiment, it will be readily understood by those skilled in the art that various modifications could be brought thereto without departing from the spirit and scope of the invention as set forth in the appended claims.

What I claim is:

1. Apparatus for automatically tensioning the belt or chain of a variable speed mechanism comprising, a pair of conical pulley discs, over which a belt or chain of a variable drive passes and to be re-tensioned thereby, means coaxially mounting said conical pulley discs rotatably with conical surfaces of one pulley disc converging toward the other of said conical pulley discs, and movable toward and away from each other, a pair of levers pivotally mounted for movement toward and away from each other for moving said conical pulley discs toward each other, a threaded screw for moving the levers toward and away from each other in dependence upon the direction of rotation of said screw, means coupling the individual levers to the screw for movement thereby, means for rotating the screw in a direction for moving the levers toward each other to tension said belt or chain comprising a pair of discs free to rotate on said screw axially spaced thereon, two ratchets fixed on said screw for rotation therewith and axially spaced thereon, for each disc free to rotate on the screw and pawl for cooperating with a corresponding ratchet for releasably, selectively precluding the rotation of said screw in opposite directions relative to the two discs free to rotate on the screw, means comprising a helical spring coupled to both of said discs free to rotate on the screw biasing the screw in conjunction with one of said discs free to rotate on the screw and the pawl thereon in a direction for rotating the screw to effect moving of the levers toward each other, releasable lock means to releasably lock said one disc and simultaneously render ineffective the pawl thereon, whereby when said lock means is released the screw is rotated by engagement of the last-mentioned pawl with its corresponding ratchet.

2. Apparatus according to claim 1, in which said one disc free to rotate on said screw comprises a notch, and said releasable lock means comprises a stop selectively movable into and out of said notch, and means for moving said stop selectively.

3. Apparatus according to claim 1, in which said ratchets comprise hubs extending toward each other and coupled together defining a cyindrical surface, a ring rotatable about said cylindrical surface coupling said helical spring to one of said discs free to rotate on said screw.

4. Apparatus according to claim 1, in which both said discs free to rotate on said screw and said helical spring are disposed between said ratchets.

5. Apparatus according to claim 1, including a spring biasing the pawl mounted on the other of the discs free to rotate on said screw into engagement with its corresponding ratchet, whereby said screw is rotatable in a direction for winding said helical spring thereby storing energy therein and cocking the apparatus.

* * * * *